June 9, 1942. H. W. CLARK 2,285,903
APPARATUS FOR MAKING METALLIC RECEPTACLES
Original Filed Nov. 7, 1935 3 Sheets-Sheet 1

INVENTOR
Harold W. Clark
by his attorneys

June 9, 1942.  H. W. CLARK  2,285,903
APPARATUS FOR MAKING METALLIC RECEPTACLES
Original Filed Nov. 7, 1935   3 Sheets-Sheet 2
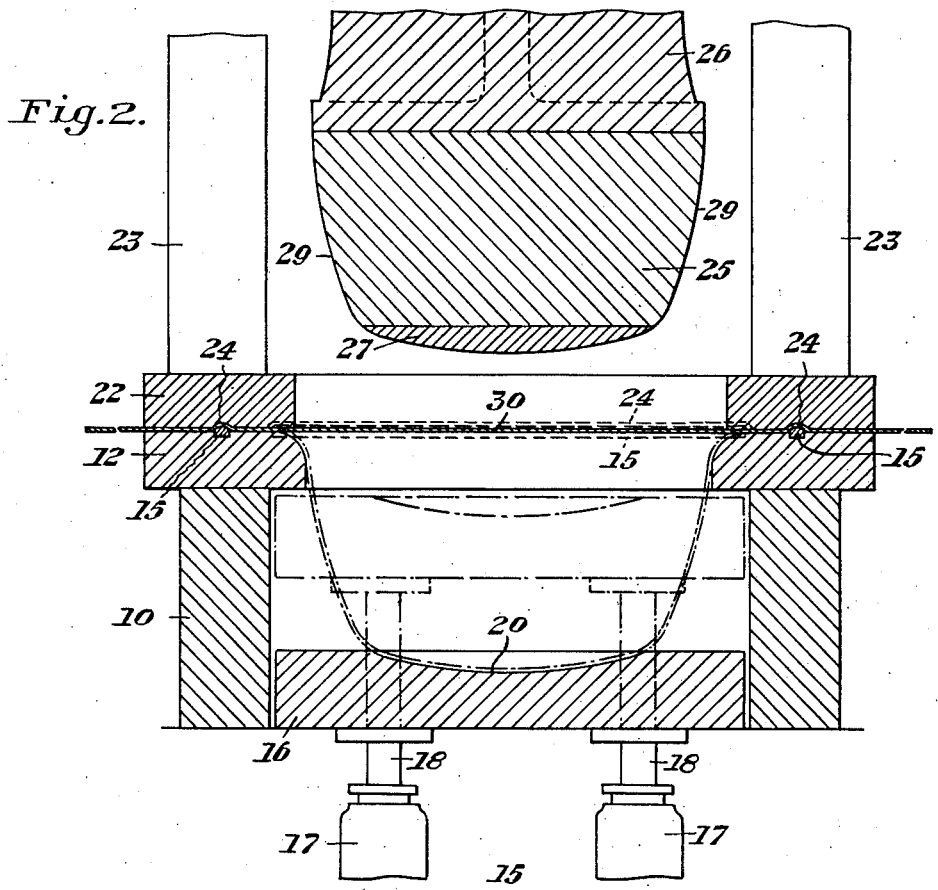
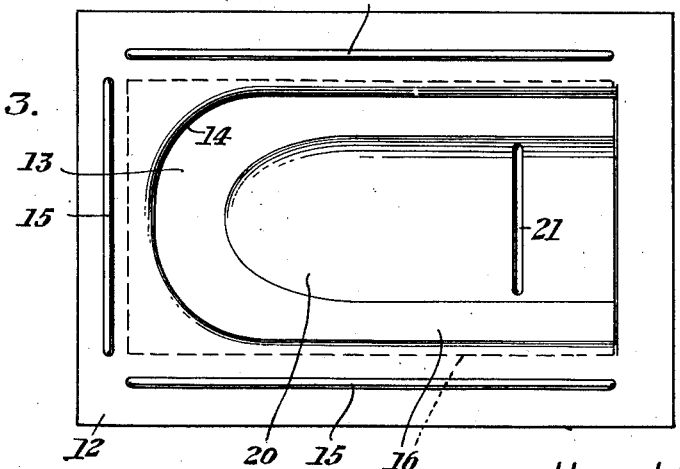
INVENTOR
Harold W. Clark

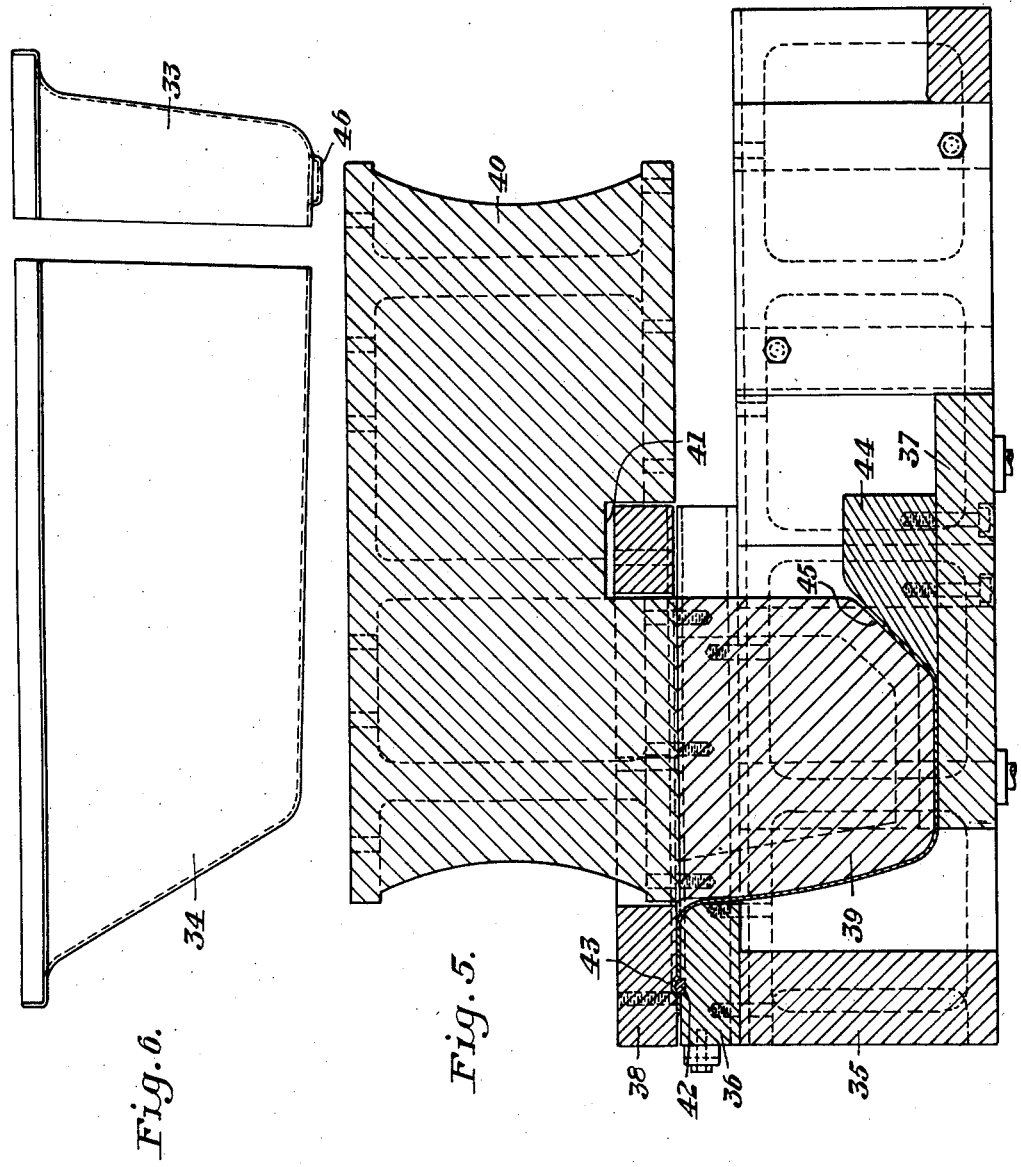

Patented June 9, 1942

2,285,903

UNITED STATES PATENT OFFICE 2,285,903

APPARATUS FOR MAKING METALLIC RECEPTACLES

Harold W. Clark, Alliance, Ohio, assignor to The Steel Sanitary Company, Alliance, Ohio, a corporation of Ohio Original application November 7, 1935, Serial No. 48,664, now Patent No. 2,176,738, dated October 17, 1939. Divided and this application March 8, 1939, Serial No. 260,577

2 Claims. (Cl. 113—46)

This invention relates to the manufacture of metal receptacles and, in particular, to receptacles made by the deep drawing of sheet steel. The invention will be disclosed as applied to the manufacture of bath tubs from sheet steel, but it will be apparent that other articles of like nature may be produced by the same method and apparatus, or with only slight modifications thereof. This application is a division of my copending application, Serial No. 48,664, filed November 7, 1935, and now Patent No. 2,176,738. Certain other subject matter disclosed in my said application Serial No. 48,664 and herein but not claimed in either thereof is disclosed and claimed in my copending applications Serial Nos. 260,575 and 260,576, filed of even date herewith, and now matured into Patent Nos. 2,225,767 and 2,206,763, which are also divisions of my said copending application Serial No. 48,664.

While it has been proposed heretofore to make bath tubs by deep drawing a single steel sheet, so far as I am aware, this result has never been obtained commercially, at least on a practical basis. While it is probably possible to draw a tub of conventional design from a single steel sheet, the amount of waste involved by the excessive scrap produced is so great as to rule out this possibility commercially. It has also been proposed heretofore to produce bath tubs by forming a plurality of tub sections and welding them together. This method has not met with wide success because of the cost of welding the several joints and the problems introduced by the necessity for enameling thereover.

I have invented a method of making bath tubs by joining only two blanks, i. e., a drain-end blank and a bell-end blank, by a circumferential seam or joint. This reduces the amount of welding necessary to a minimum. The invention also makes it possible to draw the two tub sections or blanks from single sheets without forming an excessive amount of scrap. In accordance with my invention, I draw a steel sheet through a suitably shaped die ring by means of a punch press and restrain the flow of the metal adjacent the edge of the sheet over the draw ring to insure proper shaping of the resulting section without the formation of wrinkles, folds or scratches. A present preferred embodiment of the invention and a preferred practice thereof are illustrated in the accompanying drawings, although it is to be understood that the invention may be otherwise embodied and practiced within the scope of my broader claims. In the drawings:

Figure 2 is a transverse sectional view thereof;

Figure 3 is a plan view of the draw ring;

Figure 5 is a view similar to Figure 1 showing the apparatus for forming the other tub section; and Figure 6 is a side elevation of the two sections ready to be joined together by welding.

I prefer to employ a so-called "toggle" press for forming the tub sections. As is well known, this is a form of mechanical press having two slides or vertically movable members adapted to operate in a predetermined succession. Since the construction of presses of this character is well known, it is not herein illustrated nor described. It is sufficient to state that the press has a work-supporting table in the form of a bolster adapted to support the dies through which the sheet is drawn, and at least two vertically movable slides adapted to operate in succession.

A bottom spacer 10, which is a box-shaped casting open at the top and bottom, is adapted to rest on the bolster. The plane of the upper surface thereof is indicated by the line 11. A draw ring 12 is secured to the bottom spacer 10. As best shown in Figure 3, the draw ring is substantially rectangular in outline and has an opening 13 therein rounded at one end, the edge of the opening being curved at the sides and rounded end thereof, as shown at 14. The upper surface of the draw ring 12 is provided with ribs, tongues or splines 15 extending along the sides and rounded end of the opening 13. The purpose of these splines will become apparent as the description of the apparatus proceeds.

Figure 1:
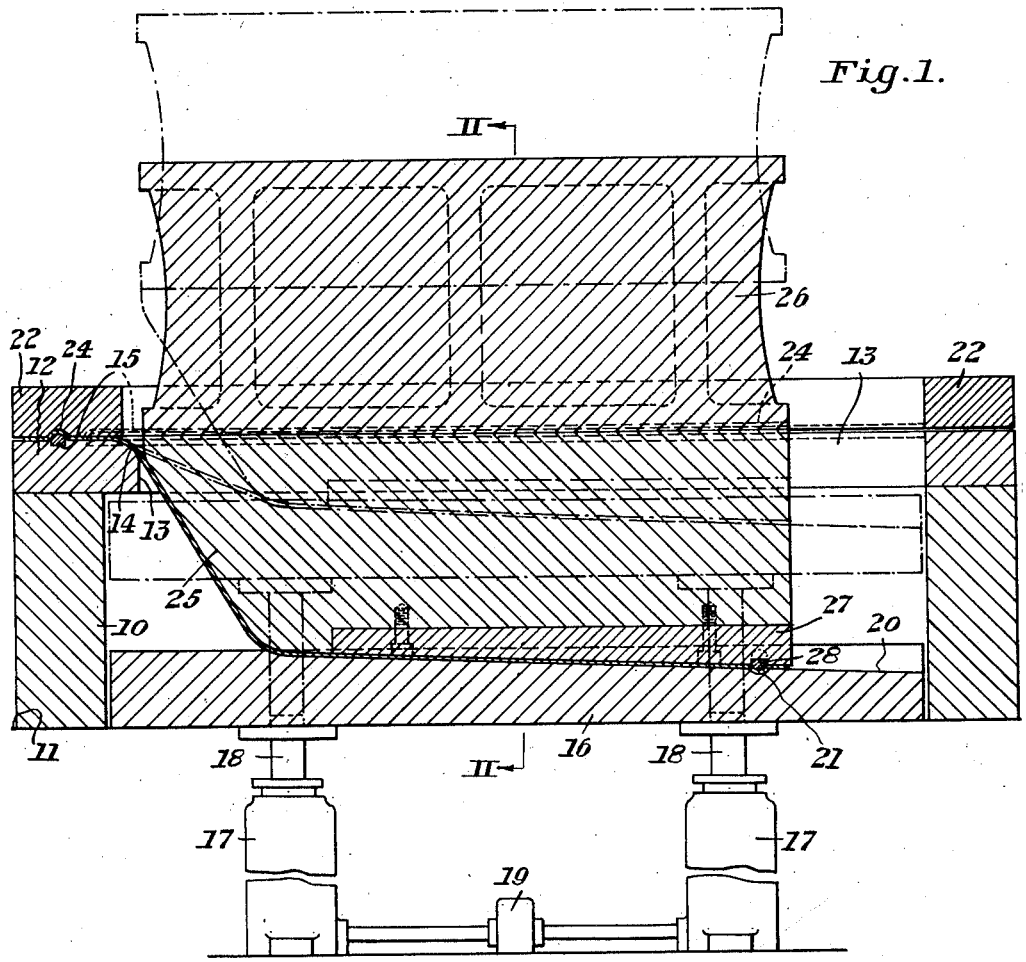
Figure 1 is a longitudinal sectional view through the punch and die of my invention.

A pressure pad 16 is reciprocable within the bottom spacer 10 by means of pneumatic cylinders 17 having pistons 18 slidable therein on which the pad rests. The supply of air to the cylinders 17 is controlled by any suitable form of valve, indicated diagrammatically at 19. The upper surface of the pad 16 is concave, as shown at 20, providing a matrix to assist in shaping a metal sheet being drawn to the final contour desired in the finished product. The pad 16, adjacent the right-hand end as shown in Figures 1 and 3, is provided with a transverse groove 21, the purpose of which will be explained shortly.

A blank holder ring 22 is mounted on one of the slides of the press, specifically that which descends first. The slide on which the blank holder ring is supported is indicated diagrammatically at 23 in Figure 2. The blank holder ring is simply a heavy plate or slab with an opening therein conforming generally to the outline of that in the draw ring 12. The undersurface of the blank holder ring has grooves 24 therein adapted to overlie the ribs or splines 15 on the draw ring 12. It will be apparent that if a steel sheet is laid across the draw ring 12 while the blank holder ring 22 is elevated, the cooperating ribs or splines and grooves will serve to grip the edge of the plate, as indicated in Figures 1 and 2 and retard flow of the metal sheet therebetween as the central portion thereof is pressed inwardly and downwardly.

A punch 25 is mounted on an extension 26 secured to the other slide of the press, viz., that which descends last. The punch 25 is shaped to produce the desired contour of the finished bell-end tub section. A removable plate or shoe 27 is secured to the lower face of the punch to permit the latter to be employed for making tub sections of different lengths. The plate 27 has a rib or spline 28 adapted to cooperate with the groove 21 in the pad 16 for the same purpose as the ribs and grooves in the draw ring and blank holder. It will be observed that the sides of the punch are convex outwardly, as shown at 29. The resulting tub section has a similar contour which is desirable in that it prevents reverse buckling such as is experienced due to expansion and contraction when enameling a tub having a flat or plane side wall. By curving the side wall of the tub, any buckling that may occur takes place in one direction only and is not reversible, with the result that the enamel coating is not fractured.

The operation of the apparatus already described will probably be apparent but will nevertheless be reviewed briefly. The toggle press is first operated so as to withdraw the punch 25 and the blank holder ring 22. A steel sheet, such as that shown at 30, is laid across the draw ring 12. The press is then operated so as to cause the blank holder ring 22 to descend and grip the sheet 30 adjacent its edges. The pad 16 is then raised to the position shown in chain lines, by manipulation of the valve 19. The press is then operated so as to cause the punch 25 to descend and progressively shape the sheet from the flat condition, through the intermediate stage shown in dotted lines in Figure 1, to the final form shown in solid lines in Figure 1. As the punch descends and deforms the sheet, the edges and central portion thereof are stretched and deformed and there is actually some flow of the edges of the sheet between th draw ring and the blank holder ring. The cooperating splines and grooves on these parts, however, limit the inward flow of the sheet edges so that the deformation caused by the parts is largely taken up by the elongation of the central portion of the sheet. This makes it possible to employ as drawing stock a flat sheet having the minimum dimensions sufficient to form a tub so that the waste due to scrap is correspondingly reduced. At the same time the center portion of the blank is smoothly shaped to the desired contour. The pad 16 assists in giving the proper form to the finished tub section, being depressed against the air pressure in the cylinders 17 by the punch 25 as the latter descends. The spline 28 and the groove 21 act in the same manner as the splines and grooves on the draw ring and blank holder ring, to limit flow of the sheet longitudinally of the punch and pad. While some flow occurs, the deformation is permitted largely by the stretching of the center part of the sheet.

Figure 4:
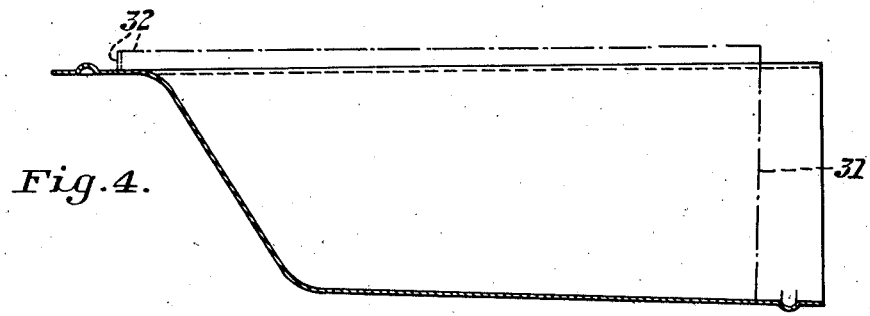
Figure 4 is a longitudinal section through the tub section produced by the apparatus of Figures 1 through 3.

The finished tub section on removal from the draw ring has the appearance shown in Figure 4. The end of the section is then trimmed off along the chain line 31 and the edges of the section sheared and flanged upwardly as shown at 32.

As explained in Rodman Patent 2,114,150, the procedure in utilizing the removable shoe 27 for the manufacture of tubs of different overall lengths having identical drain ends, is to change the trimming line 31 to give a bell-end blank of the desired length. Thus if the illustrated position of the line 31 represents the trimmed length of the bell-end blank for a 5½' tub, similar blanks for a 5' and 4½' tub may be produced by changing the shoe 27 and shearing the blank closer to the closed end thereof. The different shoes produce blanks having different bottom slopes but the same depth at the open end when trimmed to different lengths, thereby permitting the same drain-end blank to be welded to all sizes of bell-end blanks to produce finished tubs in a range of overall lengths. Since the shape of the drawn blank is determined primarily by the shape of the punch and its shoe, it is not necessary to change the pad 16 when changing the shoe 27, although the pad may be changed if desired.

The method and apparatus above described, with some slight modification, may also be employed to form the drain end of a tub such as indicated at 33 in Figure 6, the finished bell end being shown at 34 in the same figure. Figure 5 illustrates the apparatus which I prefer to employ for forming drain ends for tubs. This apparatus corresponds generally to that of Figures 1 through 3, including a bottom spacer 35, a draw ring 36 secured thereto, a pad 37 reciprocable within the spacer 35 on pneumatic cushions, a blank holder ring 38, a punch 39, and a punch extension 40. The draw ring 36 is similar to that shown at 12 but is of substantially U-shape in plan, being open at one end. The blank holder ring is closed and the punch extension 40 is recessed at 41 to receive the inner cross member thereof. The draw ring and blank holder ring are provided with splines and grooves 42 and 43, as already described. The punch 39 differs from the punch 25 so as to give the finished drain end of the tub the proper shape. The pad 37 is provided with a filler 44. The inner end of the punch, furthermore, is inclined as at 45. As a result, the inner end of the blank or flat sheet is bent upwardly around the inclined end of the punch. This construction of the pad filler and punch serves the same purpose as the rib 28 and groove 21 of the punch and pad of Figure 1 except that the construction of Figure 5 exerts a greater force restraining flow of the metal stock around the punch.

The operation of the modified form of apparatus shown in Figure 5 is similar to that already described, the only difference being that the center portion of the inner end of the sheet of stock is bent upwardly around the punch as the latter initially engages the sheet. On removal from the draw ring 36 after retraction of the punch and blank holder ring, the tub section is then trimmed and its edges flanged as shown at 33. In order to form a drain in the bottom of the drain end of the tub, I punch a hole centrally thereof. After punching a hole in the substantially flat bottom of the drain end, I then press the metal adjacent the hole out of the general plane of the bottom of the drain end, as shown at 46. I find that this method prevents fracture of the metal which occurred when it was attempted to deform the material surrounding the hole before punching the hole itself.

While it is quite possible to form tub sections in a single pressing operation as described above, I have found that the operation can be somewhat facilitated by making it in two stages and annealing the partly formed sections after the first operation at a temperature of between 1300 and 1400° F.

After the tub sections shown in Figure 6 have been produced, they are ready for joining, for example, by electric welding and, after the welded joint has been ground down, the finished tub can be enameled in the usual manner.

It will be apparent from the foregoing description that the invention provides a simple and highly practical method of making tubs or other similar receptacles from flat sheet metal by forming two sections each in a single operation if desired, and joining them together. As before stated, the method and apparatus disclosed make possible the accomplishment of this result with a minimum of scrap material and dies, thus reducing the cost of the finished product.

Although I have illustrated and described but one preferred embodiment of the apparatus and practice of the method, apparatus and procedure other than that described may be employed without departing from the spirit of the invention or the scope of the appended claims.

I claim:

1. Apparatus for forming from sheet metal a blank adapted to constitute the bell-end of a bath tub composed of two stampings, i. e., a bell-end and a drain-end, connected by a welded joint circumferentially of the tub, said blank including a rounded, sloping bottom, sides and a rounded, sloping end, the other end being open, said apparatus comprising a draw ring having an elongated opening therein rounded at one end, an elongated punch reciprocable through said ring, the end of said punch cooperating with the rounded end of the ring being similarly rounded and sloping downwardly toward the other end of the punch, the bottom of the punch proper being substantially flat over the greater portion of its length, a shoe removably secured to and covering the greater portion of the flat bottom of the punch proper, said shoe having a bottom face curved transversely of the punch and sloping downward toward said other end thereof, and a yieldable pad below said punch having a matrix therein shaped to receive said shoe snugly with a thickness of metal therebetween and thereby form the rounded, sloping bottom of the blank.

2. Apparatus for forming from sheet metal a blank adapted to constitute the bell-end of a bath tub composed of two stampings, i. e., a bell-end and a drain-end connected by a welded joint circumferentially of the tub, said blank including a rounded, sloping bottom, sides, and a rounded, sloping end, the other end being open, said apparatus comprising a draw ring having an elongated opening therein rounded at one end, an elongated punch reciprocable through said ring, the end of said punch cooperating with the rounded end of the ring being similarly rounded and sloping downwardly toward the other end of the punch, the bottom of the punch proper having a shoe-seating surface over the greater portion of its length, a shoe removably secured to and covering the greater portion of the shoe-seating surface of the punch proper, said shoe having a bottom face curved transversely of the punch and sloping downward toward said other end thereof, and a yieldable pad below said punch having a matrix therein shaped to receive said shoe snugly with a thickness of metal therebetween and thereby form the rounded, sloping bottom of the blank.

HAROLD W. CLARK.